United States Patent
Yokono et al.

(10) Patent No.: US 9,897,024 B2
(45) Date of Patent: Feb. 20, 2018

(54) ENGINE CONTROL DEVICE (71) Applicant: Mitsubishi Electric Corporation, Tokyo (JP)

(72) Inventors: Michihisa Yokono, Kobe (JP); Hideki Hagari, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 9 days.

(21) Appl. No.: 15/062,307

(22) Filed: Mar. 7, 2016

(65) Prior Publication Data
US 2017/0082047 A1 Mar. 23, 2017

(30) Foreign Application Priority Data

Sep. 17, 2015 (JP) .................................. 2015-183815

(51) Int. Cl.
F02D 41/14 (2006.01)
F02D 41/02 (2006.01)
(Continued)

(52) U.S. Cl.
CPC ....... *F02D 41/021* (2013.01); *F02D 41/0002* (2013.01); *F02D 41/144* (2013.01);
(Continued)

(58) Field of Classification Search
CPC ..... F02D 2200/0418; F02D 2200/0414; F02D 2200/703; F02D 41/021; F02D 41/0002;
(Continued)

(56) References Cited

U.S. PATENT DOCUMENTS

| | | | | |
|---|---|---|---|---|
| 7,715,976 B1* | 5/2010 | Xiao | ................... | F02D 41/0072 123/406.48 |
| 2014/0238370 A1* | 8/2014 | Pursifull | ............... | F02D 41/005 123/690 |
| 2015/0337745 A1* | 11/2015 | MacNeille | .............. | F02D 37/02 123/406.48 |

FOREIGN PATENT DOCUMENTS

| | | |
|---|---|---|
| JP | 10-2772 A | 1/1998 |
| JP | 2957769 B2 | 10/1999 |

(Continued)

OTHER PUBLICATIONS

Communication dated May 17, 2016, from the Japanese Patent Office in counterpart application No. 2015-183815.

*Primary Examiner* — Lindsay Low
*Assistant Examiner* — George Jin
(74) *Attorney, Agent, or Firm* — Sughrue Mion, PLLC; Richard C. Turner (57) ABSTRACT

In an engine control device, a saturated water vapor pressure Ps is calculated from an intake temperature detected by an intake air temperature sensor. A water vapor partial pressure is worked out from the saturated water vapor pressure and humidity detected by a humidity sensor. A specific humidity q and a molar fraction are worked out from the water vapor partial pressure and an atmospheric pressure detected by an atmospheric pressure sensor. A moist air amount is calculated from an intake air amount detected by an AFS on the basis of the molar fraction, and a dry air amount is calculated from this moist air amount on the basis of the specific humidity. A fuel injection amount, an ignition timing, and a target throttle opening are then calculated on the basis of various operation information, using the moist air amount, the dry air amount, and the specific humidity.

6 Claims, 10 Drawing Sheets (51) Int. Cl.
  *F02D 41/00*  (2006.01)
  *F02D 41/26*  (2006.01)
  *F02P 5/15*   (2006.01)
  *F02D 41/18*  (2006.01)
(52) U.S. Cl.
  CPC ............. *F02D 41/18* (2013.01); *F02D 41/26* (2013.01); *F02P 5/15* (2013.01); *F02D 41/182* (2013.01); *F02D 41/187* (2013.01); *F02D 2200/0418* (2013.01); *F02D 2200/703* (2013.01); *Y02T 10/42* (2013.01)
(58) Field of Classification Search
  CPC .... F02D 41/26; F02D 41/144; F02D 41/1441; F02D 41/18; F02D 41/182; G01N 19/10; F01N 2560/028; F02P 5/15; F02M 35/1038; F02M 35/10373; F02M 26/46
  USPC ............................................ 73/29.01, 114.31
  See application file for complete search history.

(56) References Cited

FOREIGN PATENT DOCUMENTS

| | | |
|---|---|---|
| JP | 2014-137004 A | 7/2014 |
| JP | 5680178 B1 | 3/2015 |

\* cited by examiner

ENGINE CONTROL DEVICE

BACKGROUND OF THE INVENTION

1. Field of the Invention

The present invention relates to an engine control device that uses an intake air amount, which is a control parameter of an engine, namely an internal combustion engine (hereafter, referred to simply as engine), after correcting the intake air amount by humidity.

2. Description of the Related Art

Recent years have witnessed the spread of engine control devices of so-called "torque base control" type that control the torque generated by an engine using, as an index, an engine output shaft torque that is utilized as a requested value of driving force from the driver or from the vehicle. In such a torque base control, a target torque of the engine is determined on the basis of an operation amount of an accelerator pedal by the driver. A throttle opening degree is then controlled in such a manner that a target intake air flow rate that allows generating the target torque is sucked into the engine, and a fuel injection amount or ignition timing is controlled in accordance with an actual intake air flow rate such that engine output is controlled to the target torque, whereby the running performance requested by the driver is realized.

In such an engine control device that realizes the target intake air flow rate corresponding to the target torque of the engine, throttle opening is controlled through driving of an actuator that is linked to the throttle of the engine. Specifically, a technology has been proposed wherein a target opening area of the throttle is worked out by being applied to a flow rate calculation expression or equation of a diaphragm type flow meter based on a target intake air flow rate, a pressure ratio before and after the throttle, a throttle opening area and so forth, and an actuator linked to the throttle is controlled so as to bring about a throttle opening at which the target opening area of the throttle is attained.

The amount of air that is sucked into the engine is detected by an air flow sensor (hereafter, occasionally abbreviated as "AFS") that is disposed in an air intake passage. As the AFS, there is generally used a thermal fluid sensor in which the amount of heat transferred to a fluid from a heating element disposed in the fluid is detected electrically, to detect thereby the flow rate of the fluid (for instance, Japanese Patent No. 5680178).

In the environment where the engine is used, water vapor denoted by humidity is generally present in the air that is sucked into the engine. Humidity, i.e. the amount of water vapor in the air, varies depending on weather conditions and the like. The heat transfer rate and viscosity coefficient of "moist air", which is air that contains water vapor, varies depending on the amount of water vapor comprised in the moist air. The amount of heat transferred to the moist air from a heating element that is disposed in the AFS varies depending on the water vapor amount, for an identical air amount. This gives rise to air amount measurement errors in the thermal fluid sensor.

As a technology for correcting the influence of humidity on the air amount detected by the thermal fluid sensor, i.e. on the detected value of moist air amount, a circuit configuration has been proposed in which a moisture-sensitive resistive element for air humidity compensation is provided in an electronic circuit for air flow rate measurement that has a heating resistor of a thermal fluid sensor, to perform humidity correction on a measured value of air flow rate (for instance, Japanese Patent No. 2957769).

However, engine output in gasoline engines or the like is adjusted according to the amount of air that is supplied to the cylinders. The air amount is adjusted through adjustment of the opening degree of a throttle valve that is provided in an air intake passage to the cylinders. A fuel such as gasoline is mixed with the air that is supplied to the cylinders. The air-fuel mixture is compressed by pistons and is ignited. The increment in pressure derived from combustion of the air-fuel mixture is the output of the engine. Within the amount of air that is sucked into the cylinders, only dry air, which excludes water vapor comprised in air, undergoes combustion.

In Japanese Patent No. 2957769, therefore, a difference arises in the output of the engine depending on the humidity comprised in moist air i.e. depending on the amount of water vapor, even if the detected moist air amount stays the same.

An air flow rate measuring device has also been proposed in which a dry air amount is calculated from information on temperature and humidity, and the dry air amount is output as an air amount after humidity correction (for instance, Japanese Patent Application Publication No. H10-2772).

SUMMARY OF THE INVENTION

In the above torque base control there is calculated a target intake air flow rate for realizing a target torque, and there is calculated a throttle valve opening degree necessary in order to realize the target intake air amount.

However, the amount of air that passes through the throttle valve has to be calculated on the basis of the amount of moist air including water vapor. This is problematic in that at times of high humidity an error arises in the output torque of the engine with respect to the target torque, upon calculation of the throttle valve opening degree on the basis of dry air amount information alone, as in Japanese Patent Application Publication No. H10-2772.

It is an object of the present invention, which was arrived at in order to solve the above problem, to provide an engine control device that enables engine control with good precision by eliminating the influence of humidity on the detected values of a thermal fluid sensor even when humidity is high.

In order to achieve the above object, the engine control device according to the present invention comprises: a sensor that is provided in an air intake passage of an engine and detects an intake air amount of the air intake passage; a sensor that detects humidity of intake air in the air intake passage; and a control unit that corrects the intake air amount by the humidity to calculate a moist air amount, calculates a dry air amount from the moist air amount on the basis of the humidity, and uses the moist air amount and the dry air amount as control elements of the engine.

In the present invention, a configuration is resorted to wherein an intake air amount is corrected by humidity, to calculate a moist air amount, and a dry air amount is then calculated on the basis of the humidity from the moist air amount, whereupon the moist air amount and the dry air amount are used as control elements of the engine. A prominent effect is therefore elicited of enabling enhanced engine control precision, in terms of exhaust gas purification or the like, while controlling with good precision the torque requested by the driver even when humidity is high.

DESCRIPTION OF THE EMBODIMENTS

Embodiments of the engine control device according to the present invention will be explained next in detail with reference to accompanying drawings.

Embodiment 1

Figure 1:
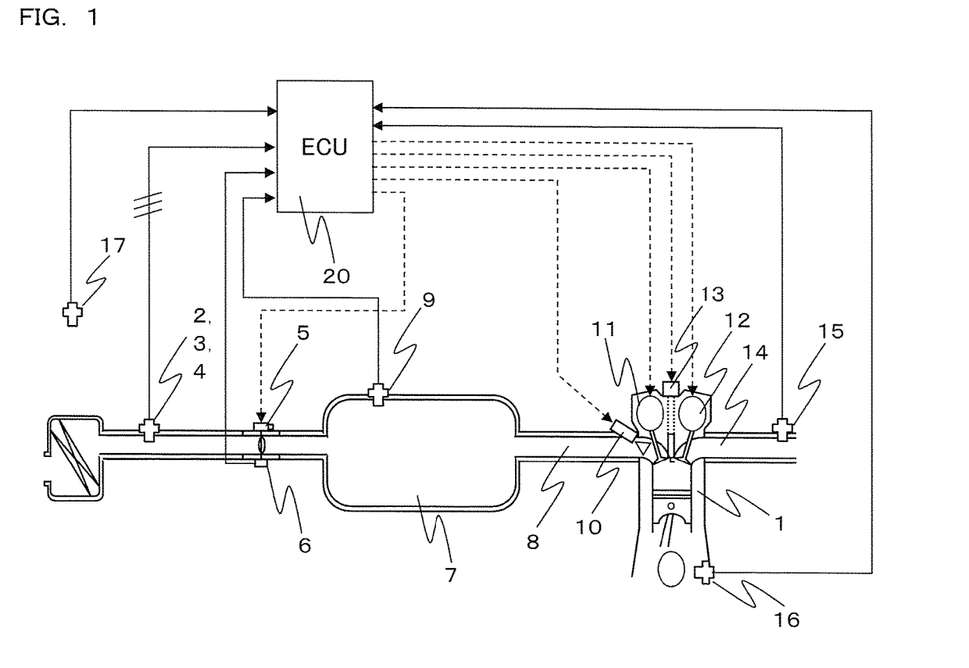
FIG. 1 is a diagram illustrating the overall configuration of an engine control device according to the present invention.

In FIG. 1, an AFS 2 that performs thermal-type intake air amount detection is provided upstream of an intake system of an engine 1. An intake air temperature sensor 3 is provided in the AFS 2 as a built-in or separate sensor. A humidity sensor 4 is further provided in the AFS 2 as a built-in or separate sensor. An electronically controlled throttle 5 that can be controlled electrically is provided, for the purpose of adjusting the intake air amount, on the side of the engine downstream of the AFS 2. A throttle opening sensor 6 is provided in order to measure the opening degree of the electronically controlled throttle 5. There is further provided an intake manifold pressure sensor 9 that measures the pressure of a space that includes the interior of a surge tank 7 and of an intake manifold 8 downstream of the throttle 5 (this pressure will be hereafter, abbreviated as intake manifold pressure).

Figure 2:
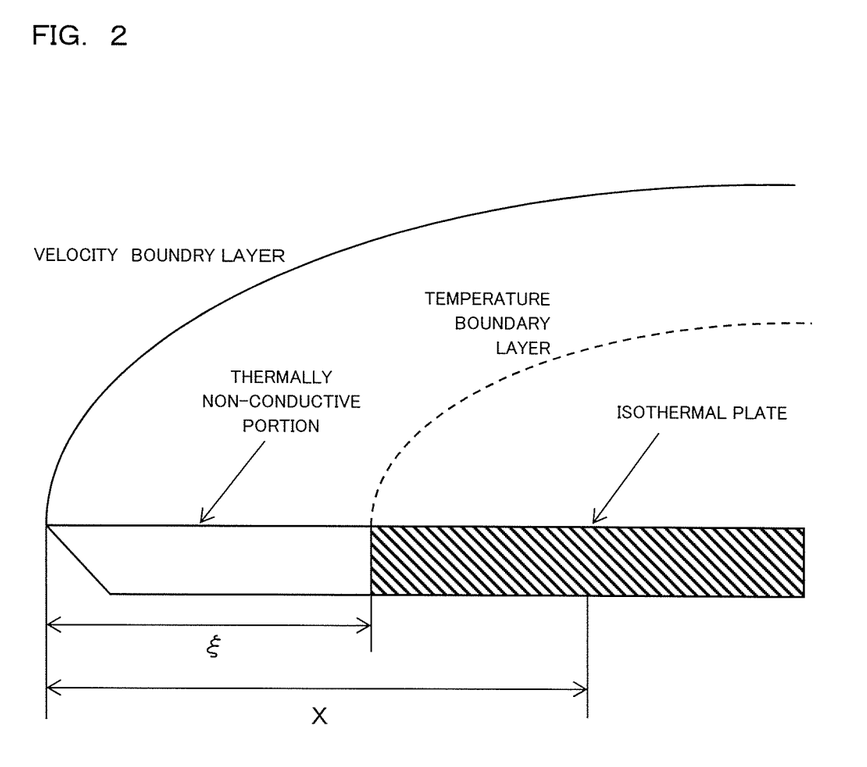
FIG. 2 is a cross-sectional diagram illustrating schematically the structure of an AFS depicted in FIG. 1.
Figure 3:
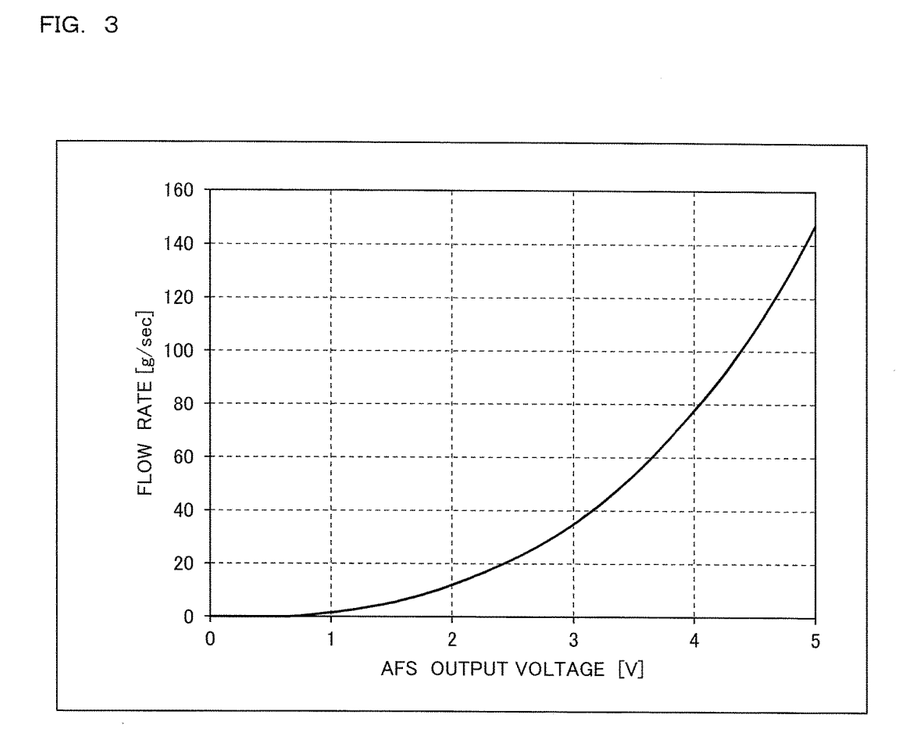
FIG. 3 is a characteristic graph diagram illustrating a relationship between output voltage and flow rate in the AFS depicted in FIG. 1 and FIG. 2.

As the AFS 2 that performs thermal-type air amount detection, a sensor being a heating element that has a flat plate-like shape, as illustrated for instance in FIG. 2, is disposed in a fluid passage. The heating element is made up of a thermally non-conductive portion and an isothermal plate. The current that flows in the heating element is controlled by an electronic circuit (not shown) in such a manner that the temperature of the heating element is constant. In the AFS 2, the air flow rate is detected on the basis of electrical changes derived from the influence of robbed heat depending on the amount of passing air. The detected value of the AFS 2 is output for instance as a voltage signal that is input to an ECU 20 or the like. The air flow rate with respect to the voltage value has a nonlinear characteristic, for instance such as the one illustrated in FIG. 3. Accordingly, a conversion process to air flow rate can be performed in the ECU 20 on the basis of a characteristic table or the like stored beforehand, instead of on the basis of calculation expressions.

Generally, the humidity sensor 4 may be of resistive type, in which humidity is detected on the basis of the electric resistance value of a moisture-sensitive material, or of electrostatic capacitive type, in which humidity is measured on the basis of the capacitance of a sensor element. The humidity detected by the humidity sensor 4 is relative humidity, regardless of the detection method. Herein the term relative humidity denotes the ratio of the partial pressure of water vapor in air with respect to the saturated water vapor pressure determined by the temperature of the air. Relative humidity varies depending on the temperature of air, even if the water vapor partial pressure in air stays the same.

An injector 10 for injecting fuel is provided in the vicinity of the intake manifold 8 and an intake valve (not shown) that includes the interior of a given cylinder. An intake variable valve timing mechanism (hereafter, abbreviated as VVT) 11 and an exhaust VVT 12 for modifying valve timing are provided respectively in the intake valve and in an exhaust valve (not shown). An ignition coil 13 for driving a spark plug that generates a spark in the cylinder is provided in the cylinder head. An air-fuel ratio sensor 15 and a catalyst (not shown) are provided in an exhaust manifold 14. In some instances, only one of the intake VVT 11 and the exhaust VVT 12 is provided, while in other instances neither of them is provided. An atmospheric pressure sensor 17 for detecting atmospheric pressure, which is the environment pressure of the engine, is provided outside the engine.

Various operation information of the engine 1, including detection signals from the above-described sensors, from a crank angle sensor 16 that detects a crank angle and an engine speed, and from other sensors not shown, as well as information on, for instance, an ignition switch (hereafter, abbreviated as IG-S/W), which is an engine startup switch, is input to the ECU 20 that comprises a micro-computer and an interface circuit.

In the ECU 20, the target torque is calculated from the various operation information that is input, and there is calculated a target intake air flow rate at which the target torque is attained. To attain the target intake air flow rate, a target throttle opening is worked out through calculation of a target effective opening area as described below. The opening degree of the electronically controlled throttle 5 is controlled in such a way so as to attain the target throttle opening. At the same time there are calculated respective instruction values for the various actuators including the injector 10, the intake VVT 11, the exhaust VVT 12 and the ignition coil 13.

Figure 4:
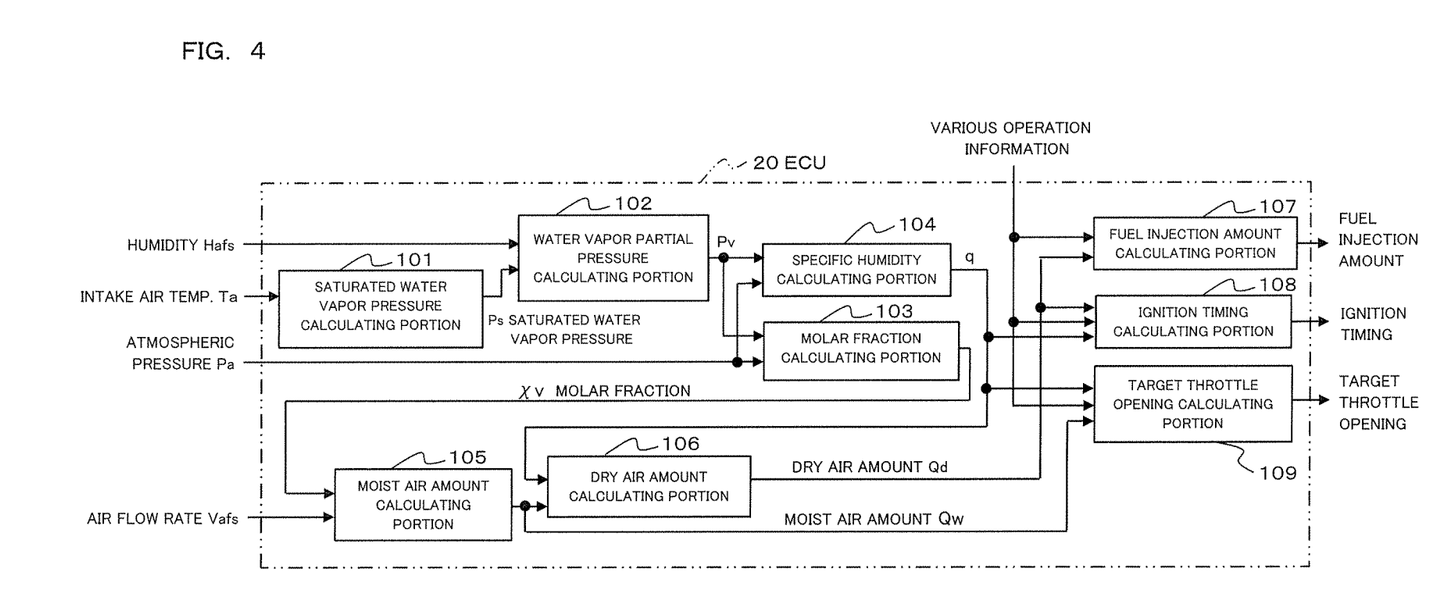
FIG. 4 is a block diagram illustrating functionally an electronic control unit (hereafter, abbreviated as ECU) depicted in FIG. 1.

A processing operation of the ECU 20 will be explained next with reference to FIG. 4 and FIG. 5.

A signal Vafs corresponding to the intake air amount detected by the AFS 2, an intake temperature Tafs detected by the intake air temperature sensor 3, a relative humidity Hafs of intake air as detected by the humidity sensor 4, and an atmospheric pressure Pa detected by the atmospheric pressure sensor 17 are input to the ECU 20. The ECU 20 has a saturated water vapor pressure calculating portion 101, a water vapor partial pressure calculating portion 102, a molar fraction calculating portion 103, a specific humidity calculating portion 104, a moist air amount calculating portion 105, a dry air amount calculating portion 106, a fuel injection amount calculating portion 107, an ignition timing calculating portion 108 and a target throttle opening calculating portion 109.

Figure 5:
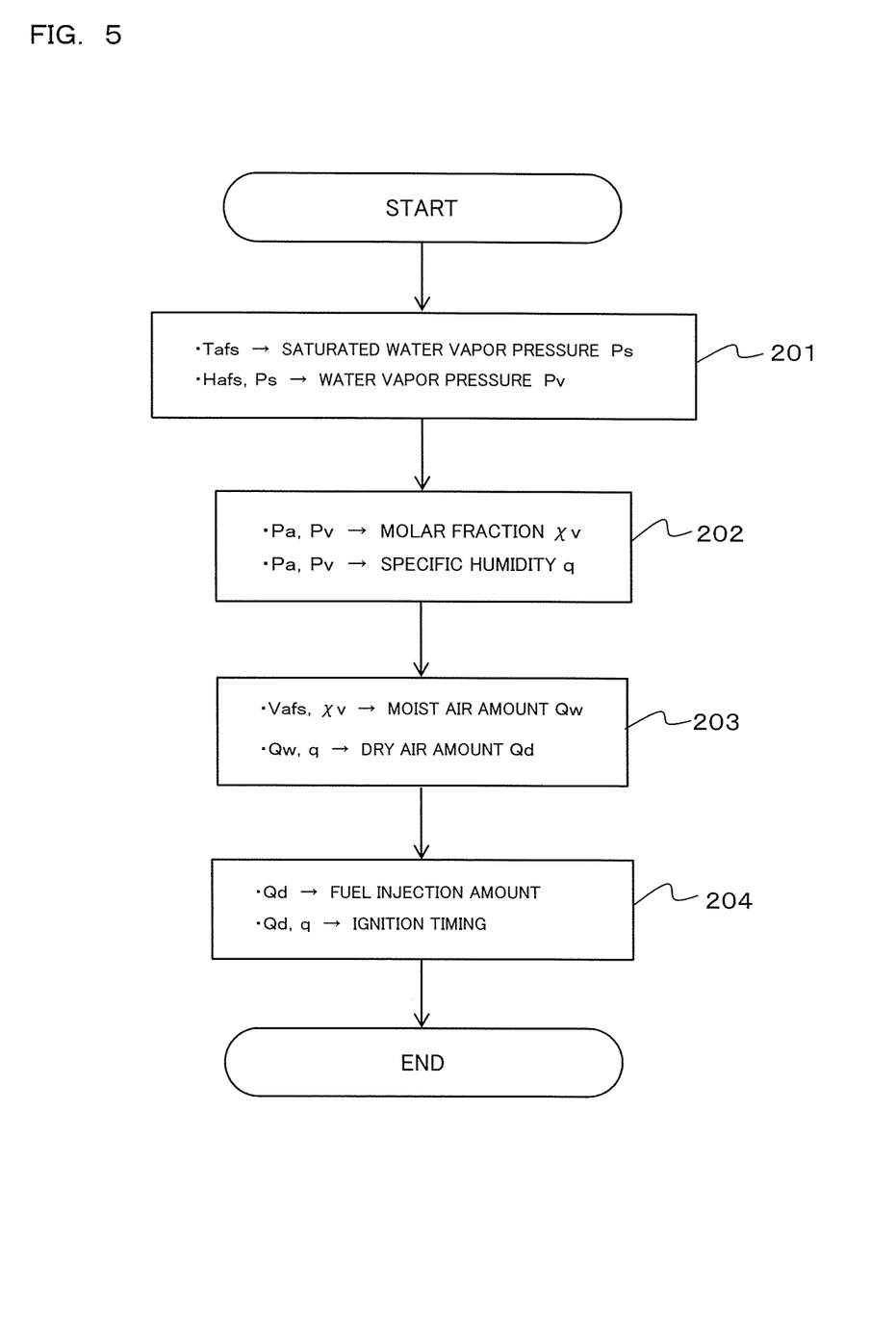
FIG. 5 is a flowchart illustrating a process of the ECU depicted in FIG. 4.

The saturated water vapor pressure calculating portion 101 receives the input of the intake temperature Tafs and calculates a saturated water vapor pressure Ps (step 201 in FIG. 5). The saturated water vapor pressure Ps denotes the pressure of water vapor at a time where water vapor is in a saturated state at a given temperature, and, as is generally known, is calculated for instance according to Expression 1 by Tetens, as a function of temperature. In the expression, T is the temperature (° C.) corresponding to the intake temperature Tafs in the saturated water vapor pressure calculating portion 101.

$$P_S = 6.1078 \times 10^{\left(\frac{7.5 \times T}{T+237.3}\right)}[hPa] \qquad \text{Expression 1}$$

In a case where the influence of exponentiation on processing load and so forth poses a concern for the computing power of the ECU 20, the saturated water vapor pressure Ps may be calculated by setting a table or the like using temperature, instead of by relying on Expression 1 above.

The water vapor partial pressure calculating portion 102 receives the input of the saturated water vapor pressure Ps and the relative humidity Hafs, and calculates a water vapor partial pressure Pv (step 201 in FIG. 5). The water vapor partial pressure denotes the pressure of water vapor included in a gas. The relationship of the water vapor partial pressure Pv with the saturated water vapor pressure Ps is given by Expression 2 below. In the expression, Hr is relative humidity (% RH) and corresponds to the relative humidity Hafs in the water vapor partial pressure calculating portion 102.

$$P_v = P_S \times \frac{H_r}{100} [hPa] \qquad \text{Expression 2}$$

The molar fraction calculating portion 103 receives the input of the atmospheric pressure Pa and the water vapor partial pressure Pv, and calculates a molar fraction χv (step 202 in FIG. 5). The molar fraction denotes the ratio between mole numbers of water vapor and of moist air, and is a ratio between the amounts of substance of the water vapor and of moist air. The ratio of amounts of substance is equal to a ratio of pressures, according to the generally known Dalton's Law; hence, the molar fraction χv can be expressed as Expression 3 below.

$$\chi_v = \frac{P_v}{P_a} \qquad \text{Expression 3}$$

The atmospheric pressure Pa and the water vapor partial pressure Pv are also input to the specific humidity calculating portion 104, as in the case of the molar fraction calculating portion 103, but the specific humidity calculating portion 104 calculates herein a specific humidity q (step 202 in FIG. 5). The specific humidity denotes the proportion of the mass of water vapor with respect to the mass of moist air; when expressed for a unit volume, the specific humidity q is a ratio of densities, as given by Expression 4 below. In the expression, ρw is the density of moist air, ρv is the density of water vapor, and ρd is the density of dry air; thus there holds ρw=ρd+ρv.

$$q = \frac{\rho_v}{\rho_w} = \frac{\rho_v}{\rho_d + \rho_v} \qquad \text{Expression 4}$$

The density ρ of a gas according to a generally known state equation of ideal gases is given by Expression 5 below, and the gas constant R of gases is given by Expression 6, where P is the pressure of the gas, R is the gas constant of the gas, T is the temperature of the gas, R0 is the universal gas constant, and M is the molecular weight of the gas.

$$\rho = \frac{P}{RT} \qquad \text{Expression 5}$$

$$R = \frac{R_0}{M} \qquad \text{Expression 6}$$

Expression 7 and Expression 8 below represent the density ρv of water vapor and the density ρd of dry air using Expression 5 and Expression 6 above, where Mv is the molecular weight of water vapor and Md is the molecular weight of dry air.

$$\rho_v = \frac{P_v \times M_v}{R_0 \times T} \qquad \text{Expression 7}$$

$$\rho_d = \frac{(P_a - P_v) \times M_d}{R_0 \times T} \qquad \text{Expression 8}$$

Expression 9 below is obtained by substituting Expression 7 and Expression 8 in Expression 4, and substituting 18.015 for the molecular weight Mv of water vapor and 28.966 for the molecular weight Md of dry air. It is found that the specific humidity q can be calculated using Expression 9 on the basis of the atmospheric pressure Pa and the water vapor partial pressure Pv.

$$q = \frac{M_v}{M_d} \times \frac{P_v}{P_a - \left(1 - \frac{M_v}{M_d}\right) \times P_v} = 0.622 \times \frac{P_v}{P_a - 0.378 \times P_v} \qquad \text{Expression 9}$$

The moist air amount calculating portion 105 receives, as an input, the output voltage Vafs from the AFS 2 and the molar fraction χv, and provides, as an output, a moist air amount Qw (step 203 in FIG. 5). The sensor portion of the flat plate shape of the AFS 2 is provided in a fluid. As illustrated in 2, heat transfer from the sensor to the fluid can be considered as forced convection heat transfer of a non-isothermal plate in the fluid, and thus a heat transfer coefficient h is given by Expressions 10 to 12 below, where V is a flow rate of the gas, λ is the thermal conductivity of the gas, ρ is the density of the gas, μ is the viscosity coefficient of the gas, Nu is the Nusselt number, and Pr is the Prandtl number.

$$h(x, \xi) = \lambda \times \frac{Nu}{x} \times f(x, \xi) \qquad \text{Expression 10}$$

$$Nu = 0.322 \times \sqrt{\frac{\rho \times V \times x}{\mu}} \times Pr^{\frac{1}{3}} \qquad \text{Expression 11}$$

$$f(x, \xi) = \left\{1 - \left(\frac{\xi}{x}\right)^{\frac{3}{4}}\right\}^{-\frac{1}{3}} \qquad \text{Expression 12}$$

Expressions 10 to 12 are rearranged to yield Expression 13 below. By assuming a fixed value K for the term in brackets on the right side of Expression 13, a heat transfer rate h can be simplified to Expression 14 below.

$$h(x, \xi) = \frac{\lambda}{\sqrt{\mu}} \times (\rho \times V)^{\frac{1}{2}} \times \left\{\frac{0.322 \times \sqrt{x}}{x} \times Pr^{\frac{1}{3}} \times f(x, \xi)\right\} \qquad \text{Expression 13}$$

$$h(x, \xi) = \frac{\lambda}{\sqrt{\mu}} \times (\rho \times V)^{\frac{1}{2}} \times K \qquad \text{Expression 14}$$

The heat transfer coefficient h can accordingly be regarded as being correlated to $\lambda/\sqrt{\mu}$.

In this case, the heat transfer coefficient h is correlated to the amount of heat that is robbed from the heating element of the sensor by the fluid, and the robbed amount of heat is correlated to the output voltage of the AFS 2. In Expression 14, the term ($\rho \times V$) can be regarded as the amount of flowing air. For an identical air amount, the output voltage Vafs of the AFS 2 can thus be regarded as correlated to $\lambda/\sqrt{\mu}$.

As is generally known, both the thermal conductivity $\lambda$ of air and the viscosity coefficient $\mu$ of air vary with humidity. The thermal conductivity $\lambda$ of air and the viscosity coefficient $\mu$ of air, varying with humidity, are given by Expressions 15 to 20 below, where S is the Sutherland constant, the subscript w is moist air comprising water vapor, d is dry air and v is water vapor.

$$\mu_w = \frac{\mu_d}{1 + \frac{\chi_v \times \Phi_{dv}}{(1-\chi_v)}} + \frac{\mu_v}{1 + \frac{(1-\chi_v) \times \Phi_{dv}}{\chi_v}} \qquad \text{Expression 15}$$

$$\Phi_{dv} = \frac{\left\{1 + \left(\frac{\mu_d}{\mu_v}\right)^{\frac{1}{2}} \times \left(\frac{M_v}{M_d}\right)^{\frac{1}{4}}\right\}^2}{\frac{4}{\sqrt{2}} \times \left(1 + \frac{M_d}{M_v}\right)^{\frac{1}{2}}} \qquad \text{Expression 16}$$

$$\Phi_{vd} = \frac{\left\{1 + \left(\frac{\mu_v}{\mu_d}\right)^{\frac{1}{2}} \times \left(\frac{M_d}{M_v}\right)^{\frac{1}{4}}\right\}^2}{\frac{4}{\sqrt{2}} \times \left(1 + \frac{M_v}{M_d}\right)^{\frac{1}{2}}} \qquad \text{Expression 17}$$

$$\lambda_w = \frac{\lambda_d}{1 + \frac{\chi_v \times A_{dv}}{(1-\chi_v)}} + \frac{\lambda_v}{1 + \frac{(1-\chi_v) \times A_{vd}}{\chi_v}} \qquad \text{Expression 18}$$

$$A_{dv} = \frac{1}{4} \times \left[1 + \left\{\frac{\lambda_d}{\lambda_v} \times \left(\frac{M_v}{M_d}\right)^{\frac{3}{4}} \times \frac{\left(1 + \frac{S_d}{T}\right)^{\frac{1}{2}}}{\left(1 + \frac{S_v}{T}\right)}\right\}^{\frac{1}{2}}\right]^2 \times \frac{\left(1 + \frac{S_{dv}}{T}\right)}{\left(1 + \frac{S_d}{T}\right)} \qquad \text{Expression 19}$$

$$A_{vd} = \frac{1}{4} \times \left[1 + \left\{\frac{\lambda_v}{\lambda_d} \times \left(\frac{M_d}{M_v}\right)^{\frac{3}{4}} \times \frac{\left(1 + \frac{S_v}{T}\right)^{\frac{1}{2}}}{\left(1 + \frac{S_d}{T}\right)}\right\}^{\frac{1}{2}}\right]^2 \times \frac{\left(1 + \frac{S_{dv}}{T}\right)}{\left(1 + \frac{S_v}{T}\right)} \qquad \text{Expression 20}$$

In the above Expressions 15 to 20, Md, Mv, Sd, Sv and Sdv are constants, and hence the thermal conductivity $\lambda$w of moist air and the viscosity coefficient $\mu$w of moist air can be regarded as correlated to the molar fraction $\chi$v; the heat transfer coefficient h, i.e. the output voltage Vafs of the AFS 2 can likewise be regarded as correlated to the molar fraction $\chi$v.

As described above, FIG. 3 illustrates a relationship between the output voltage Vafs of the AFS 2 and the mass flow rate of air flowing around the AFS 2, It is here supposed that this characteristic is measured beforehand for dry air and stored in the form of a map.

Figure 6:
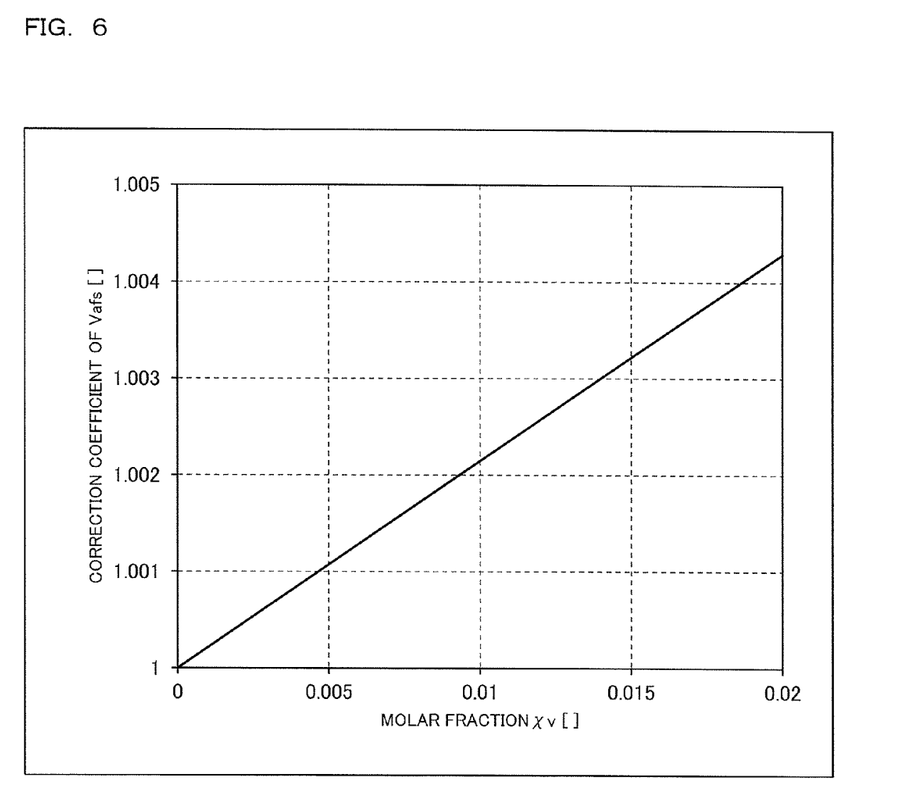
FIG. 6 is a graph diagram illustrating a relationship between molar fraction and a correction coefficient of AFS output Vafs, depicted in FIG. 4 and FIG. 5.

FIG. 6 illustrates, with reference to dry air, a correction coefficient of output voltage Vafs of the AFS 2 with respect to changes in humidity, i.e. the molar fraction $\chi$v at a time where moist air flows at a flow rate identical to that of the dry air. It is found that the correction coefficient of the output voltage Vafs of the AFS 2 increases as the molar fraction $\chi$v increases.

In the moist air amount calculating portion 105, the Vafs correction coefficient, being the rate of change given by the characteristic of FIG. 6, is calculated from the molar fraction $\chi$v, and the voltage Vafs is divided by the Vafs correction coefficient. As a result, the voltage Vafs is corrected to a Vafs value in dry air, as when the characteristic of FIG. 3 was measured. The air flow rate, i.e. the moist air amount Qw, is calculated using the characteristic of FIG. 3 on the basis of the corrected voltage Vafs.

The moist air amount Qw that flows through the AFS 2 can thus be calculated accurately, unaffected by the state of humidity, by correcting the output voltage Vafs by the molar fraction $\chi$v, and calculating the flow rate from the corrected voltage Vafs. In the correction coefficient illustrated in FIG. 6, there may be used a modeled calculation expression; alternatively, results of calculations or measurements carried out beforehand may be stored in the form of a map.

The dry air amount calculating portion 106 receives, as an input, the moist air amount Qw and the specific humidity q worked out as described above, and provides, as an output, a dry air amount Qd (step 203 in FIG. 5). The engine 1 generates the power through combustion of the air-fuel mixture of air and gasoline in each cylinder. This combustion is elicited by dry air that is sucked into the cylinder, and hence the amount obtained by excluding the water vapor fraction from the amount of air that is sucked into the cylinder is the dry air amount. That is, the moist air amount Qw sucked into the cylinder is the sum of dry air amount Qd and water vapor amount Qv, and can be expressed by Expression 21 below.

$$Q_w = Q_d + Q_v = Q_d\left(1 - \frac{Q_v}{Q_d}\right) \qquad \text{Expression 21}$$

The mass ratio and the density ratio are identical per unit volume. Expression 22 below is thus obtained by re-writing Expression 21 using the dry air amount Qd and replacing the mass ratio by the density ratio.

$$Q_d = \frac{1}{\left(1 - \frac{\rho_v}{\rho_d}\right)} \times Q_w = \left(1 - \frac{\rho_v}{\rho_d + \rho_v}\right) \times Q_w \qquad \text{Expression 22}$$

According to Expression 4, $\rho v/(\rho d+\rho v)$ represents the specific humidity q; accordingly, the dry air amount Qd is given by Expression 23 below.

$$Q_d = (1-q) \times Q_w \qquad \text{Expression 23}$$

Thus, the moist air amount Qw and the dry air amount Qd can be calculated. The moist air amount Qw and the dry air amount Qd are used as control elements of the engine, described below.

Firstly, the dry air amount Qd and various operation information are input to the fuel injection amount calculating portion 107, which outputs a fuel injection amount i.e. a driving amount of the injector 10 (step 204 in FIG. 5). As is generally known, the fuel injection amount by the injector 10 in engine control is calculated on the basis of a ratio of the air mass and fuel mass i.e. an air-fuel ratio (hereafter, abbreviated as A/F) intended for a given operation state, and on the basis of the intake air amount during operation. The amount of air that is used for calculating this fuel injection amount is calculated using the dry air amount that contributes to combustion. This enables an optimal fuel amount for realizing a target A/F to be calculated.

A catalyst (not shown) for the purpose of exhaust gas purification is generally fitted in the exhaust passage of the engine 1. A combustion state at a stoichiometric A/F of 14.7 is suitable herein for exhaust gas purification by the catalyst. Calculating the fuel amount from the above dry air amount allows the A/F to be realized accurately. It becomes possible accordingly to suppress deviations in fuel amount, i.e. in A/F, due to the influence of humidity, and to improve exhaust gas degradation.

Figure 7:
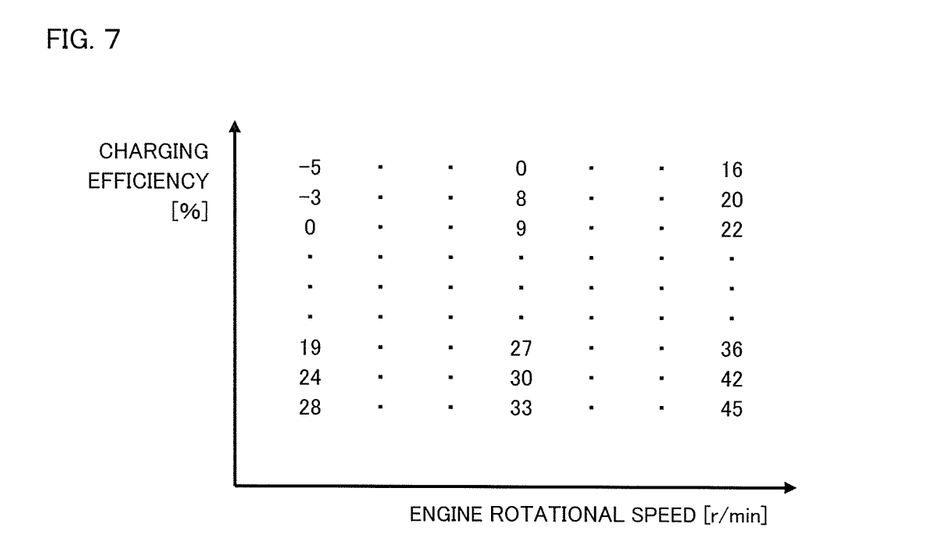
FIG. 7 is a diagram illustrating a map that is used for ignition timing calculation in an ECU.

Next, the ignition timing calculating portion 108 receives, as an input, the dry air amount Qd and the specific humidity q, and provides, as an output, an ignition timing, i.e. a driving timing of the ignition coil 13 (step 204 in FIG. 5). As is generally known, the ignition timing of the ignition coil 13 with a spark plug is calculated in engine control on the basis of the engine speed and charging efficiency. Optimal ignition timings for each engine speed and each charging efficiency are measured beforehand and are stored in the form of a map such as the one illustrated in FIG. 7. This map may be stored in the form of a plurality of separate maps for each control state of the intake VVT, exhaust VVT, and so forth.

The optimal ignition timing herein denotes generally a minimum advance for the best torque (MBT) i.e. the ignition timing on the delay side with respect to both ignition timings for limit ignition timing free from occurrence of knocking. Also for the charging efficiency that is used in the ignition timing calculation, the optimal ignition timing for a given operation state can be calculated by using the dry air amount that contributes to combustion.

Figure 8:
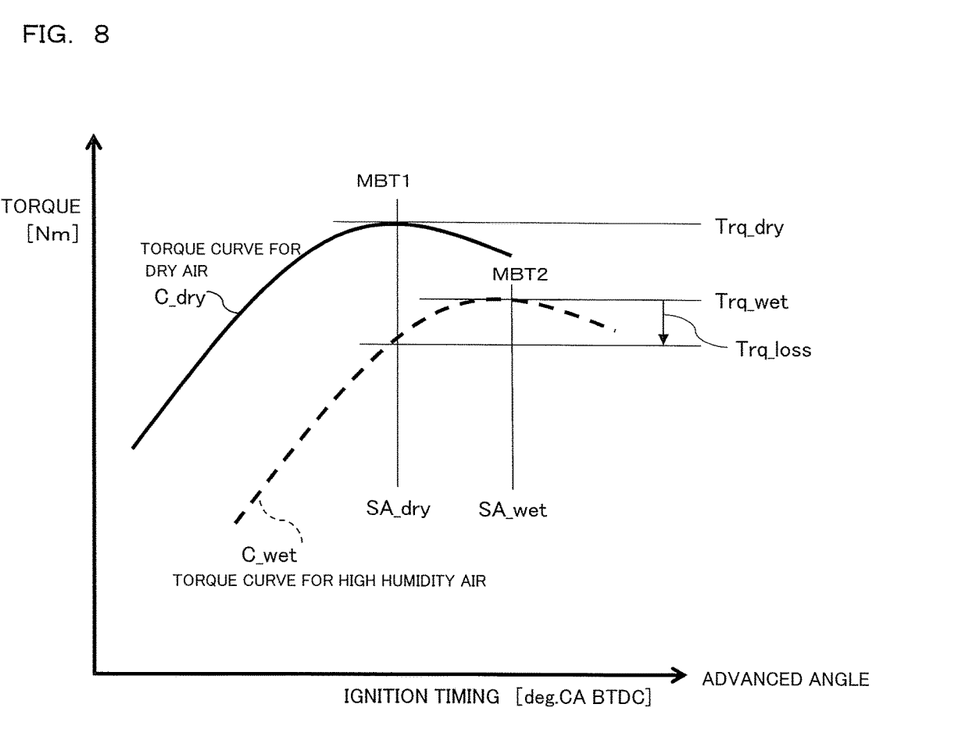
FIG. 8 is a graph diagram illustrating a relationship between ignition timing and torque in the engine control device according to the present invention.

FIG. 8 illustrates a torque curve in a certain operation state. The torque curve mentioned denotes the relationship between the torque generated by the engine and ignition timing at a time where only the ignition timing is varied in a state where the engine speed, the throttle opening i.e. the intake air amount, A/F, and the operation timing of the intake valve and the operation timing of the exhaust valve depending on the system configuration of the engine, are fixed in the operation state of the engine.

This relationship translates into a convex torque curve, where the ignition timing that yields the largest torque is referred to as the above MBT. For instance, the torque curve C_dry denoted by the solid line in FIG. 8 is measured in a state where the air sucked into the engine 1 is dry air, at a given engine speed and a given charging efficiency. Herein, MBT 1 is SA_dry, and the torque generated by the engine 1 at this time is Trq_dry, denoted by the solid line.

The reference symbol C_wet denoted by the dotted line is the torque curve measured for intake air of high humidity, resulting from increasing air humidity while keeping constant the mass flow rate of the air that is sucked into the engine 1. Herein, MBT 2 is SA_wet, and the torque generated by the engine 1 at this time is Trq_wet.

As depicted in the figure, output torque decreases as humidity rises (C_wet), compared with the situation for dry air (C_dry), and the MBT advances from MBT 1→MBT 2. That is because the dry amount of air that is sucked into the engine 1 is reduced on account of the increase in humidity. This can be verified in that the above characteristic is identical to that of an instance where the intake air amount is reduced through closing of the throttle valve 5 during operation with dry air. That is, the charging efficiency that is used in the ignition timing calculation can be controlled according to the ignition timing for a correct engine output characteristic, through calculation on the basis of the dry air amount.

Assuming that measuring and setting of the ignition timing map are carried out for dry air, in conventional control where humidity correction is not performed the ignition timing is calculated as SA_dry even though the C_wet characteristic applies during a high-humidity operation. Accordingly, ignition takes place on the delay side with respect to the MBT of the engine characteristic during such a high-humidity operation; a torque loss Trq_loss is thus incurred and fuel efficiency becomes poorer.

In the present invention, by contrast, ignition at SA_wet, which is MBT 2 on the advance side, is enabled through calculation of the ignition timing at a charging efficiency for the dry air amount, through humidity correction. This elicits as a result also an effect of making it possible to improve fuel efficiency as compared with conventional control.

Figure 9:
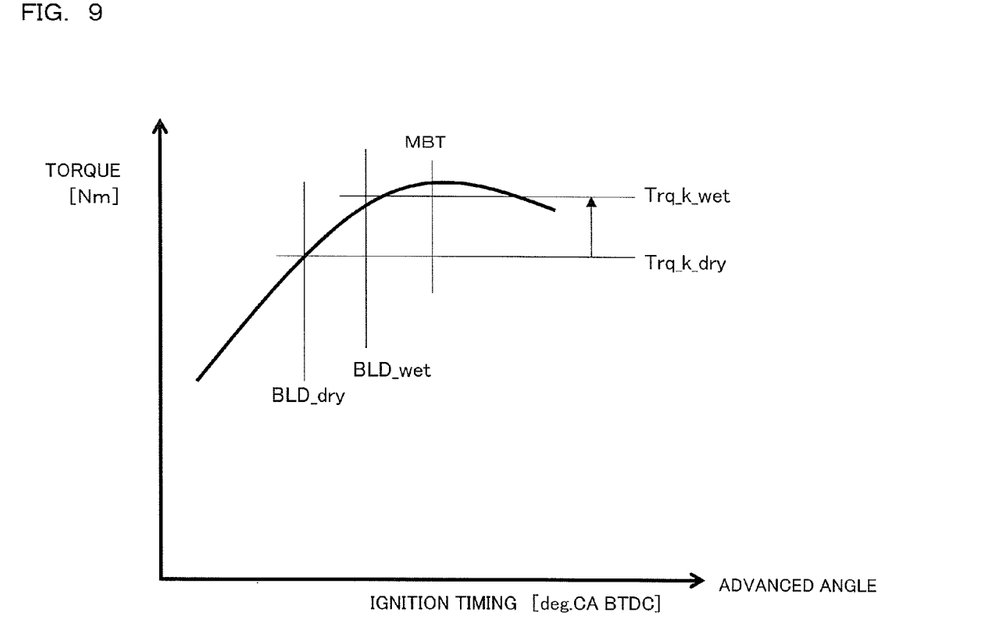
FIG. 9 is a graph diagram for explaining a knocking limit and correction by humidity in the torque curve depicted in FIG. 8.

FIG. 9 illustrates a torque curve in an operation state different from that of FIG. 8. When the ignition timing for dry air is advanced from the left of the figure up to BLD_dry, a knocking phenomenon at an inadmissible level occurs when taking into consideration performance and durability of the engine. Accordingly, BLD_dry constitutes the ignition timing at the knocking limit, and the torque generated by the engine at this time is Trq_k_dry.

The knocking limit is herein an ignition timing further on the delay side than the MBT. In the ignition timing map, there is set the knocking limit value on the delay side, or a value further on the delay side, taking into consideration for instance variability in the engine and environmental conditions.

A trend is generally observed whereby in a high load operating region of the engine the knocking limit lies further on the delay side than the MBT. In a case where the same measurement is performed in a high-humidity intake air state, the combustion rate in the cylinder is slowed down on account of water vapor. As a result, the ignition timing of the knocking limit changes from BLD_dry on the delay side to BLD_wet on the advance side. The torque generated by the engine increases then up to Trq_k_wet. That is, the ignition timing during a high-humidity operation can be further advanced in an operation state where a knocking limit, and not MBT, is set in the ignition timing map. Fuel efficiency can be thus improved through further advancing the ignition timing.

Figure 10:
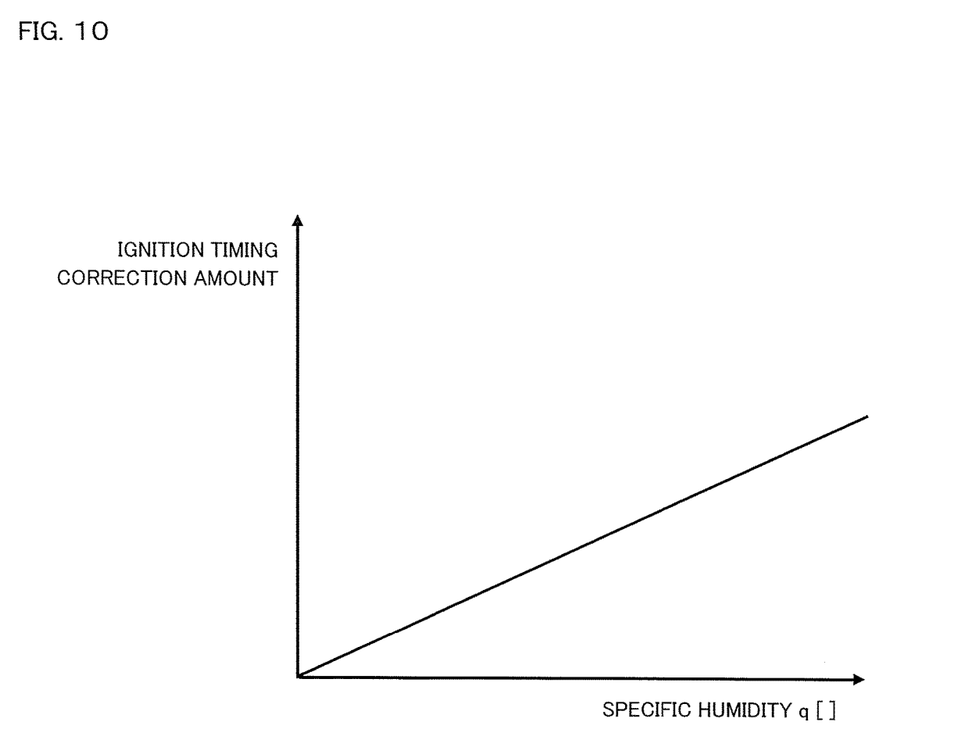
FIG. 10 is a characteristic graph diagram illustrating an ignition timing correction amount according to humidity information.

Even in a case where the ignition timing at a time of high humidity is calculated using the dry air amount, in the operation state where a knocking limit is set in the ignition timing map, the ignition timing can be further advanced. An effect of further improving fuel efficiency can be elicited therefore by calculating a correction value on the advance side using humidity information, and correcting the ignition timing calculated on the basis of the map. This correction value, i.e. an advance amount, increases as humidity rises. A relationship between humidity information, for instance, the specific humidity q, and the advance amount (advanced angle amount) may be stored beforehand in the form of a map such as the one illustrated in FIG. 10, and the map may be used to calculate the advance amount. The operation state in which the knocking limit is set on the ignition timing map is a high-load operation state by reason of engine characteristics, so that this correction of the advance amount according to humidity may be set to be carried out only in a high-load region.

Next, the target throttle opening calculating portion 109 receives, as an input, the moist air amount Qw and the specific humidity q, and calculates a target throttle opening for realizing the target torque (step 204 in FIG. 5). As described above, for the air amount by the throttle 5 in engine control, the target torque is calculated, e.g. on the basis of various operation information that is input, thereby calculating the target intake air flow rate at which the calculated target torque is attained. The target effective opening area is then calculated such that the target intake air flow rate is attained, to thereby work out the target throttle opening.

The relationship between the intake air amount and the effective opening area is given by Expression 24 below, where an intake air amount Qvth is a volume flow rate, α0 is the speed of sound of intake air, Sth is the effective opening area of the throttle, κ is the specific heat ratio of intake air, Pup is the upstream pressure of the throttle valve which is atmospheric pressure in the present invention, and Pdwn is the downstream pressure of the throttle valve which is the intake manifold pressure in the present invention.

$$Q_{vth} = \alpha 0 \times S_{th} \times \sqrt{\frac{2}{\kappa - 1} \times \left\{ \left(\frac{P_{dwn}}{P_{up}}\right)^{\frac{2}{\kappa}} - \left(\frac{P_{dwn}}{P_{up}}\right)^{\frac{\kappa+1}{\kappa}} \right\}}$$ Expression 24

Rearranging Expression 24 for the effective opening area Sth, we obtain Expression 25 below, where σ is a dimensionless flow rate that varies with the pressure ratio Pdwn/Pup. The value of the dimensionless flow rate σ at a critical pressure ratio (about 0.528 in the case of air) is constant, for a pressure ratio Pdwn/Pup being not higher than the critical pressure ratio.

$$S_{th} = \frac{Q_{vth}}{\alpha 0 \times \sigma} \text{ where}$$ Expression 25

$$\sigma = \sqrt{\frac{2}{\kappa - 1} \times \left\{ \left(\frac{P_{dwn}}{P_{up}}\right)^{\frac{2}{\kappa}} - \left(\frac{P_{dwn}}{P_{up}}\right)^{\frac{\kappa+1}{\kappa}} \right\}}$$

To calculate the throttle opening degree on the basis of the effective opening area, a model may be utilized that relies on physical calculation expressions based on the shape of the throttle valve 5; alternatively, values measured beforehand on the basis of calculations and actual measurement results may be stored in the form of a map, and the throttle opening degree may be then calculated using that map.

The target intake amount of air that is calculated from the target torque has to be calculated for the dry air that contributes to combustion. However, the amount of air that is used in the throttle opening calculation is required to be calculated for the total air amount that passes through the throttle, i.e. for the moist air amount. This is calculated in the form of the target moist air mass flow rate calculated using the relationship of Expression 23 above, from the specific humidity q and the dry air mass flow rate that is the target intake air amount.

As a result, the air amount for realizing the target torque can be calculated accurately while unaffected by the humidity state of the environment. It is generally known that the mass flow rate and volume flow rate of air can be interconverted using the density of air.

Although the amount of air that passes through the throttle valve 5 is actually input in the form of the moist air amount Qw, errors may arise in the throttle-passage flow rate with respect to the throttle opening, due for instance to manufacturing variability in the throttle valve 5. In a case where the target intake air amount and the air amount Qw actually flowing do not coincide with each other for the calculated target throttle opening degree, the target throttle opening degree is adjusted so as to correct the deviation of the target intake air amount and the air amount Qw actually flowing, such that the air amounts coincide. The correction method involves for instance generally known feedback control, learning control, or the like. The correction method will not be explained in detail in the present invention, since the present invention is not affected by the correction method.

Thus the engine output torque can be controlled with good precision, while making exhaust gas less harmful and enhancing fuel efficiency, through switching between dry air and moist air in the amounts of air that are used according to control elements.

In the engine control device according to the present invention, thus, there is worked out a moist air amount influenced by humidity, a dry air amount is calculated from the moist air amount and the humidity, and the moist air amount and the dry air amount are used as elements of engine control. Therefore, the engine output torque can be controlled with good precision, while making exhaust gas less harmful and enhancing fuel efficiency.

It is to be noted that the embodiments of the present invention can accommodate, as appropriate, various modifications and omissions without departing from the scope of the invention.

What is claimed is:

1. An engine control device comprising:
A sensor that is provided in an air intake passage of an engine and detects an intake air amount of the air intake passage;
a sensor that detects humidity of intake air in the air intake passage; and
an electric control unit that corrects the intake air amount from the detected humidity to calculate a moist air amount, calculates a dry air amount from the moist air amount on the basis of the detected humidity, and controls a throttle valve opening degree in the air intake passage using the moist air amount and the dry air amount,
wherein
the electric control unit has: a saturated water vapor pressure calculating portion that calculates a saturated water vapor pressure from a temperature of the intake air as detected by an intake air temperature sensor; a water vapor partial pressure calculating portion that calculates a water vapor partial pressure from the saturated water vapor pressure and the humidity; a specific humidity calculating portion that calculates specific humidity from the water vapor partial pressure and atmospheric pressure detected by an atmospheric pressure sensor; a molar fraction calculating portion that calculates a molar fraction from the water vapor partial pressure and the atmospheric pressure; a moist air amount calculating portion that calculates the moist air amount from the intake air amount on the basis of the molar fraction; and a dry air amount calculating portion that calculates the dry air amount from the moist air amount and the specific humidity.

2. The engine control device as claimed in claim 1, wherein the electric control unit has a fuel injection amount calculating portion that calculates a fuel injection amount using the dry air amount and various operation information.

3. The engine control device as claimed in claim 1, wherein the electric control unit has an ignition timing calculating portion that calculates ignition timing using the dry air amount, the specific humidity, and various operation information.

4. The engine control device as claimed in claim 3, wherein
the ignition timing calculating portion corrects the ignition timing to an advance side as the humidity increases, on the basis of the specific humidity.

5. The engine control device as claimed in claim 3, wherein
when the operation information denotes a high-load state of the engine, the ignition timing calculating portion corrects the ignition timing to a delay side of a limit at which knocking is not induced, and corrects the ignition timing to an advance side on the basis of the specific humidity.

6. The engine control device as claimed in claim 1, wherein the electric control unit has a target throttle opening calculating portion that calculates a target throttle opening necessary in order to realize torque as required by the engine, by using the specific humidity, the moist air amount and various operation information.

* * * * *